United States Patent [19]

Harris et al.

[11] Patent Number: 5,095,429
[45] Date of Patent: Mar. 10, 1992

[54] METHOD FOR PRIORITIZING DATA IN FINANCIAL INFORMATION SYSTEM

[75] Inventors: C. Lee Harris, San Jose; Christian D. Ovard, Fremont, both of Calif.

[73] Assignee: Pillar Corporation, Foster City, Calif.

[21] Appl. No.: 574,407

[22] Filed: Aug. 28, 1990

[51] Int. Cl.⁵ ............................................. G06F 15/30
[52] U.S. Cl. ................................................... 364/408
[58] Field of Search ............... 364/401, 408, 709.04, 364/705.06, 735

[56] References Cited

U.S. PATENT DOCUMENTS 4,845,652  7/1989  Bunsen .......................... 364/709.14

OTHER PUBLICATIONS

Harvey et al., "Lotus 1-2-3 Instant Reference: Release 2.2", SYBEX Inc., 1989, pp. 6, 7, 32-37.

Advanced Pro-Path 6, Software Inc., Clearwater, Fla., product description, Sep. 1983 (abstract only).

Primary Examiner—Dale M. Shaw
Assistant Examiner—David Huntley
Attorney, Agent, or Firm—Townsend and Townsend

[57] ABSTRACT

A method is provided for modifying calculation of a predefined procedure in a spread of financial data in a financial information system operative on a digital computer wherein data is manually input into a cell as a value, the value is prioritized above other values dependent thereon by setting a lock flag to indicate that the data is to be secured against change by subsequent recalculation on the cell and thereafter the data of all other cells which is not locked is recalculated on the basis of the priority values stored in cells designated as locked. In each case, the steps of inputting, locking, recalculating and storing are repeated for each manually entered data value. The value is recalculated upon unlocking a cell, thereby deprioritizing the data.

12 Claims, 4 Drawing Sheets

METHOD FOR PRIORITIZING DATA IN FINANCIAL INFORMATION SYSTEM

COPYRIGHT NOTICE

A portion of the disclosure of this patent document contains material which is subject to copyright protection. The copyright owner has no objection to the facsimile reproduction by anyone of the patent document or patent disclosure as it appears in the patent and trademark office, patent file or records, but otherwise reserves all copyright rights whatsoever.

BACKGROUND OF THE INVENTION

This invention relates to financial information systems and more particularly to procedures for prioritizing data display and calculation in a financial information system.

One of the tasks of a financial information system is the presentation of information in a spread form. Such information is presented in reports and analyzed, often by quarter, annual or monthly segmentation. For planning purposes it is helpful to be able to perform analysis on the basis of certain assumptions. For example, it may be known that an expenditure is not to exceed a certain dollar amount during a specified fiscal quarter and that total amounts are not to exceed a certain annual expenditure. Hence, there is a need for a user to be able to prioritize financial information according to specific limitations.

In the past, general-purpose computerized spreadsheet systems have been used wherein cells employed or contained calculations based on the content of other cells. There has been no mechanism therein to prioritize the value contained within one cell through automatic means. Each cell containing priority information would require that all other cells dependent on the priority cell contain functional calculations especially adapted to the value in the priority cell. The result has been a complex task for the end user which is susceptible to undesired errors.

SUMMARY OF THE INVENTION

According to the invention, a method is provided for modifying calculation of a predefined procedure in a spread of financial data in a financial information system operative on a digital computer wherein data is manually input into a cell as a value, the value is prioritized above other values dependent thereon by setting a lock flag to indicate that the data is to be secured against change by subsequent recalculation on the cell and thereafter the data of all other cells which is not locked is recalculated on the basis of the priority values stored in cells designated as locked. In each case, the steps of inputting, locking, recalculating and storing are repeated for each manually entered data value. The value is recalculated upon unlocking a cell, thereby deprioritizing the data.

The invention will be better understood by reference to the following detailed description in connection with the accompanying drawings.

DESCRIPTION OF THE PREFERRED EMBODIMENT

The prioritizing methodology technology or locks method as described herein is based on a specific embodiment designed for implementation on a MacIntosh type computer (Apple Computer Corporation of Cupertino, Calif.). The examples shown for illustration is the calculation of a spread by year. In the particular example herein, the locks feature may be implemented in a financial information system of the type such as is available under license from Pillar Corporation of Foster City, Calif. However, the same concept may well be implemented in other financial information systems.

Figure 1:
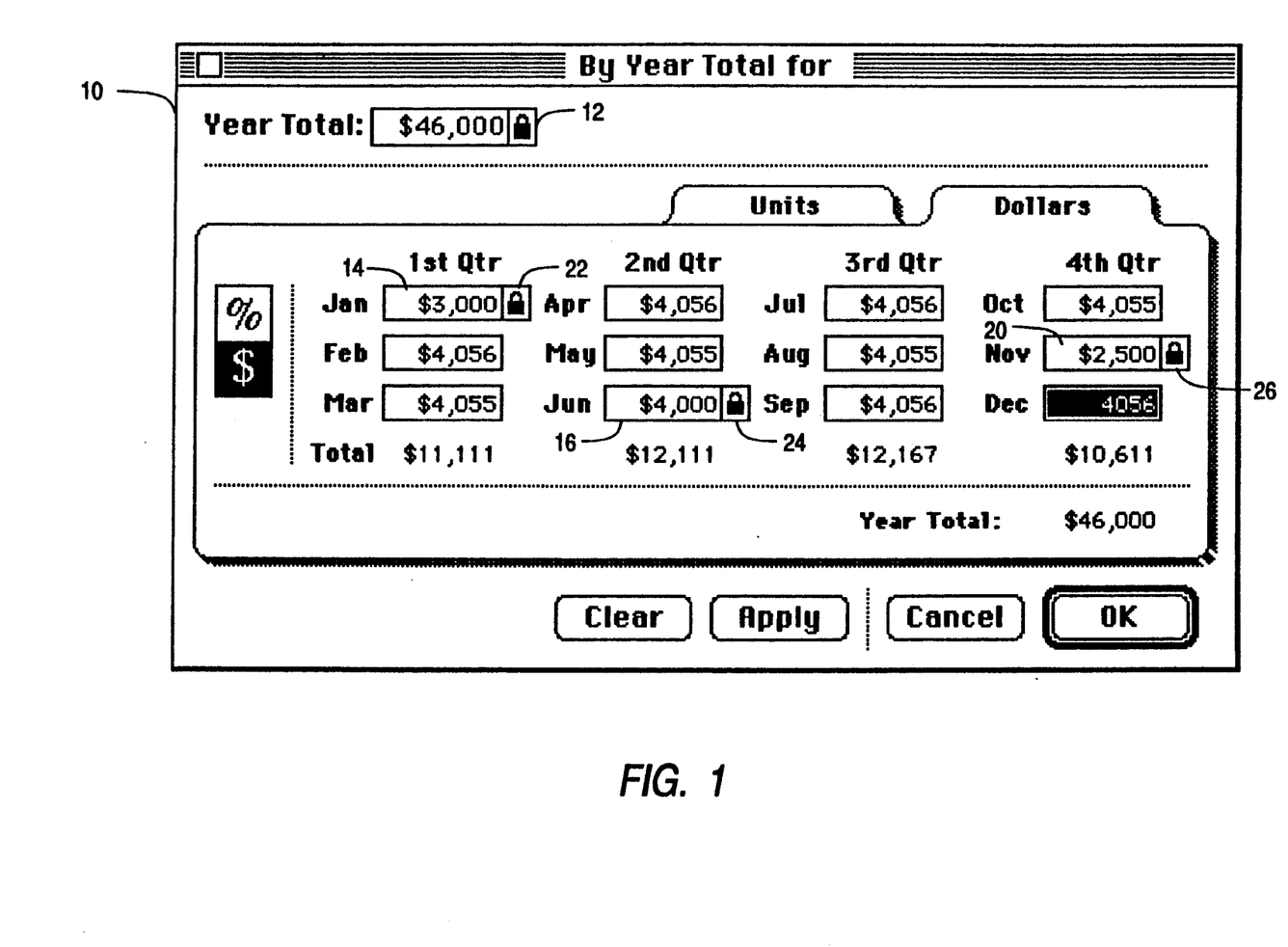
FIG. 1 is a view of a typical screen on a computer display for presenting an image of locks to a user.

Referring to FIG. 1, there is illustrated a window 10 of a sample line item in a financial information system showing a year total subdivided into quarters and months. In use, the user may enter an annual total amount specified for the entire year as shown in the cell 12, and the programs underlying the displayed window of the spread would cause that the total initially be distributed evenly over all quarters and all months according to an automatic calculation (not shown). The user may enter a command to lock individual monthly cells, such as a January cell 14, a June cell 16 and a November cell 20. Modification may be made, for example, to the June cell 16 wherein the amount is set to a umber other than the preliminarily calculated average. Another month, such as the November cell, may be set at a different amount and locked, and a still further cell may be set to a still different amount and locked, such as the January cell 14. Lock icons 22, 24 and 26 are generated by the underlying program to indicate to the user that the value entered into the respective cell is a priority value, namely, a value which is not changed by calculation.

In accordance with the invention, a value in a cell is locked automatically when the user edits the cell. The lock serves to hold the locked value constant regardless of other trends or values that are entered. For example, if the value $4000 entered in the June cell 16 is locked, another value entered in January cell 14 will cause this spread to calculate without changing the value entered in the June cell. Locked values remain unchanged until the user enters a new value, at which point the new value is locked and all other unlocked values are recalculated according to the rules of this spread to match the preselected annual total. In this particular example, the user may enter data only on a monthly basis and cannot change quarterly totals. Entry and updating of data in this manner is intuitive to the user and requires only minimal user action.

Figure 2:
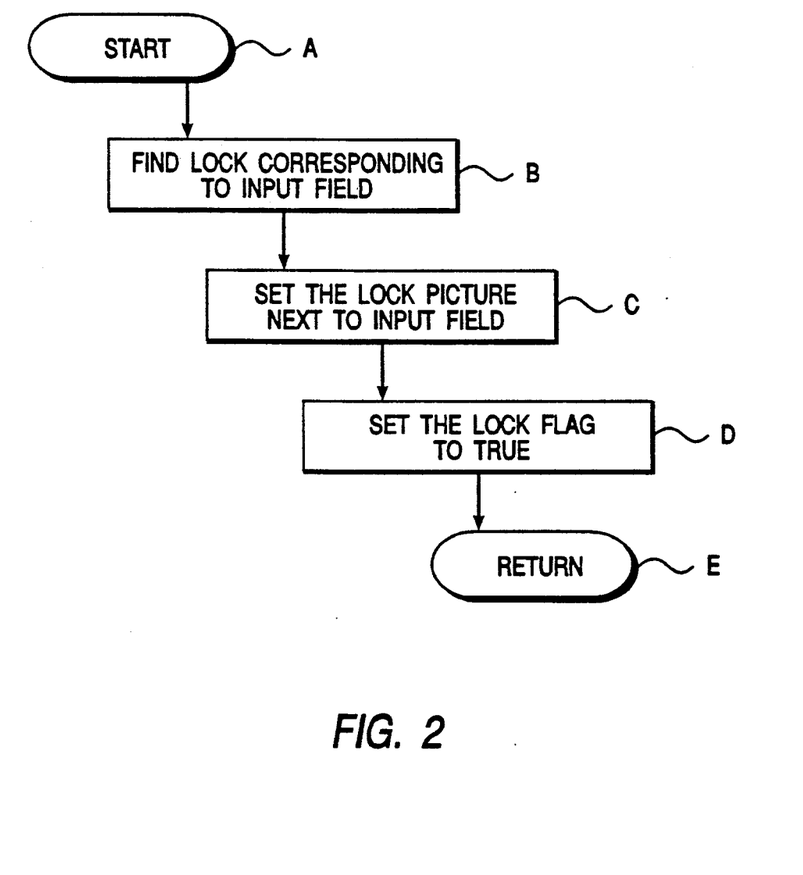
FIG. 2 is a flow chart illustrating how a locked condition is established.

Referring to FIG. 2, there is shown a flow chart illustrating how the program operates at a high level. Following a start (A) the program finds the lock corresponding to the input field in the spread (Step B). Thereafter, the program sets the lock picture next to the input field (Step C), as shown for example in cell 14 the lock icon 22 (FIG. 1). Contemporaneously, the program sets a flag designated the Locked Flag to the logic value TRUE (Step D) whereupon the program returns (E).

Appendix A attached hereto contains a source code listing for the prioritizing method according to the invention under the title TLock. The source code is presented in the Object Pascal language. A compiler for this language is available from a variety of sources, including Apple Computer Company of Cupertino, Calif. The Appendix contains annotated documentation of the various functions of the procedure.

Figure 3:
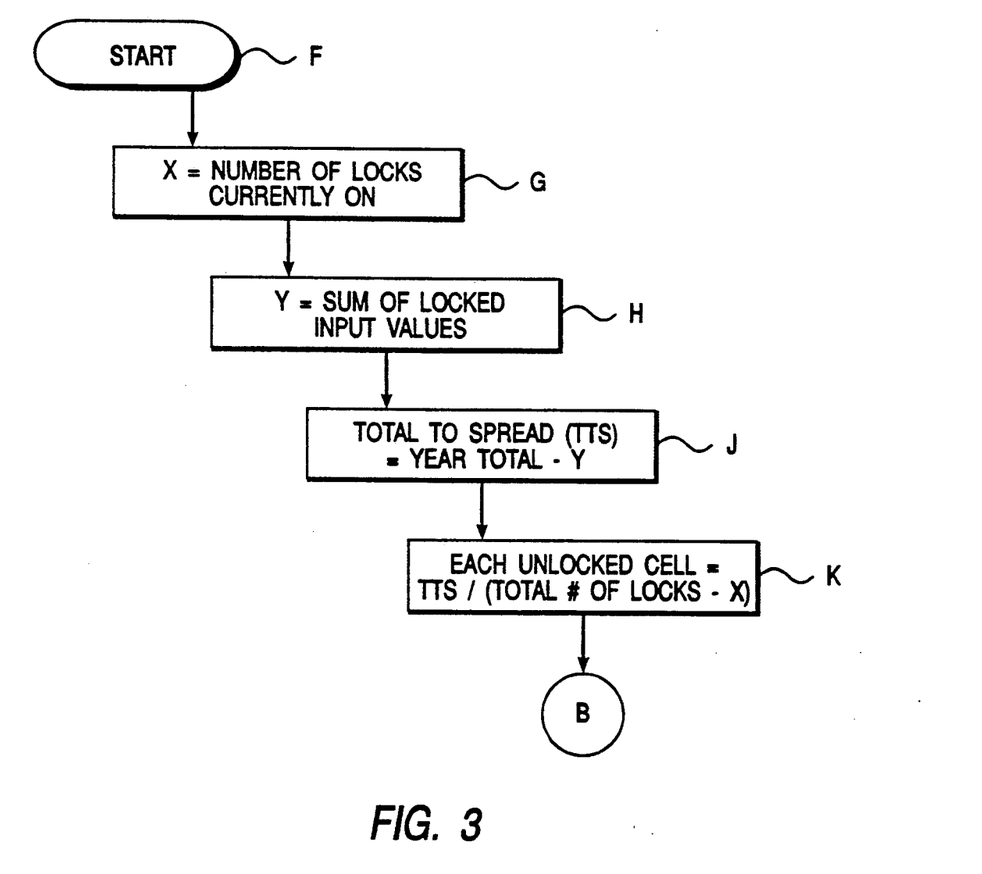
FIG. 3 is the first portion of a flow chart showing a typical calculation by year with use of the lock feature in a spread.
Figure 4:
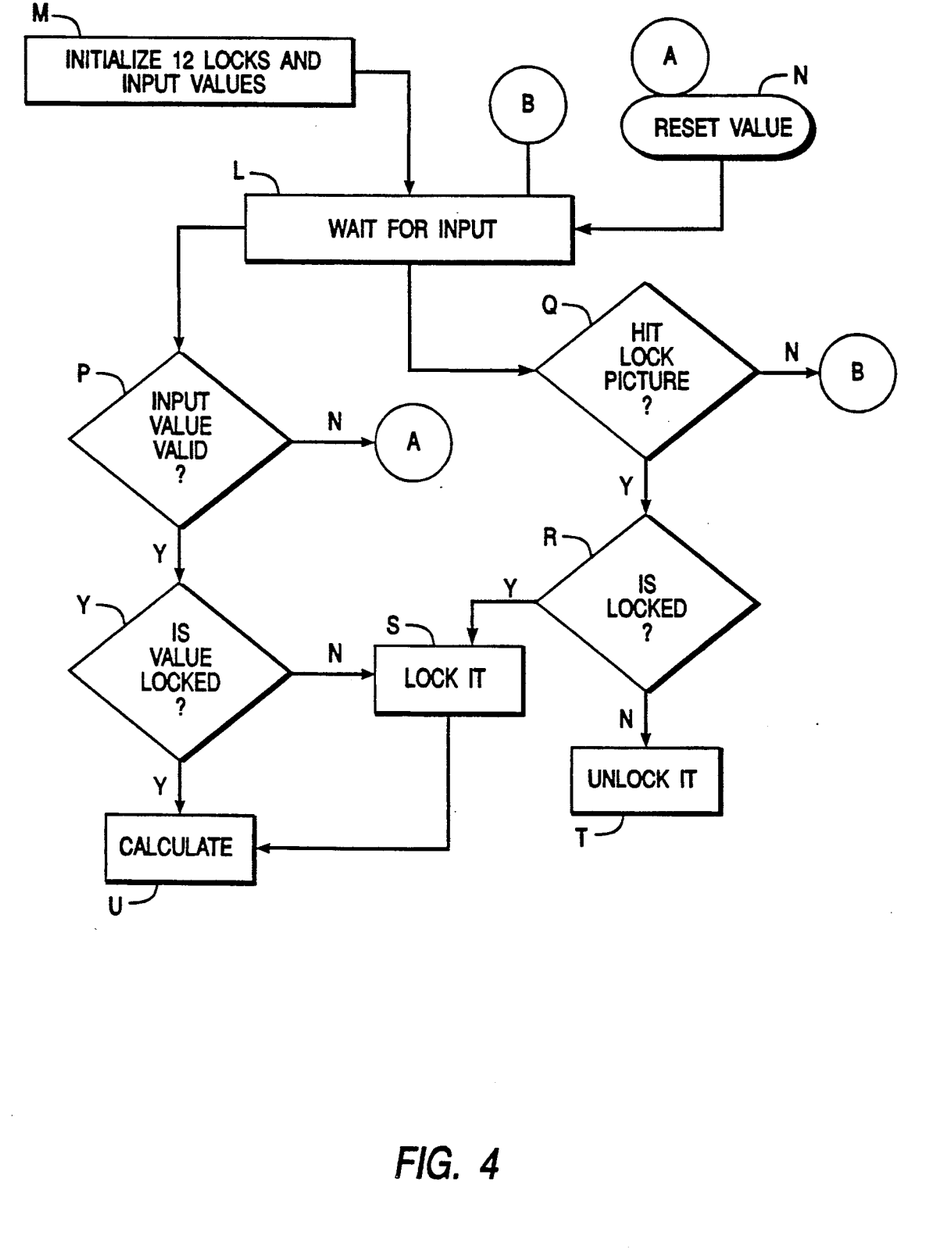
FIG. 4 is a continuation of the flow chart of FIG. 3 showing use of a lock in a spread by year.

Referring now to FIGS. 3 and 4, the calculation of a cell in a by-year spread is first illustrated (FIG. 3) in which a lock on a cell is present, and there is illustrated the use of a lock in such a spread (FIG. 4). The calculation on a spread commences (F) by counting the number of locks currently in place (Step G). Thereafter, the computer program calculates the sum of all locked input values (Step H). In the calculation, an amount remains unlocked which is to be spread across a year. Therefore it is necessary to calculate the year total less the sum of the locked input values to yield a value equal to the total to spread (TTS). This follows in a Step J. The value is then distributed to each unlocked cell as the TTS divided by the total number of locks less the number of locks currently in place or "on" (Step K).

The locks may thereafter be used in a by year spread as follows. Referring to FIG. 4, the computer program is set up in a loop to wait for input from one of several sources (Step L). One of the sources is the initialized values which in a particular embodiment may employ up to twelve possible locks. Another input is a user input value (Step M). Another input is a value to be placed in each unlocked cell (from Step K). Still another input is a reset value (Step N). The input is tested to determine whether it is directed to a locked cell (hit a locked picture) (Step Q) and whether the input is valid (Step P). If the input is not valid, the computer program loops to reset the value and to wait for input (Steps N and L). If a locked picture is not hit, then the procedure returns to wait for further input. If a locked picture is hit then the cell is toggled (Step R) either to lock it (Step S) or to unlock it (Step T) and thereafter the calculation is performed (Step U). If the input value is valid (from Step P) and the value is locked (Step V) then the cell calculation is performed (Step U).

This procedure results in the proper calculation of all cells with priority granted to those cells which are locked. The details of procedures for performing the locking and unlocking are set forth in the attached appendix with annotations.

The invention has now been explained with reference to specific embodiment. Further embodiments will be apparent to those of ordinary skill in the art. It is therefore not intended that this invention be limited, except as indicated by the appended claims.

Appendix A

```
TLock = OBJECT(TPicture)
(*********************************************************)
(*                                                        *)
(*     T L o c k                                          *)
(*                                                        *)
(*     Purpose:   Provides a lock picture button for use in spreads.  *)
(*                A key cursor is presented when the user moves the   *)
(*                cursor over the lock area.              *)
(*                                                        *)
(*     Inherited from: TPicture                           *)
(*                     TControl                           *)
(*                     TView                              *)
(*                     TEvtHandler                        *)
(*                     TObject                            *)
(*                                                        *)
(*********************************************************)
    tPeriod:    Integer;

(*********************************************)
    (*************  PRIVATE METHODS  *************)
    (*********************************************)
    PROCEDURE TLock.IRes(itsDocument: TDocument; itsSuperView: TView; VAR itsParams: Ptr); OVERRIDE;
    PROCEDURE TLock.TrackMouse(aTrackPhase: TrackPhase; VAR anchorPoint, previousPoint, nextPoint: VPoint; mouseDidMove: BOOLEAN
    FUNCTION  TLock.DoSetCursor(localPoint: Point;cursorRgn: RgnHandle): Boolean; OVERRIDE;

(*********************************************)
    (*************  PUBLIC METHODS  **************)
    (*********************************************)
    FUNCTION TLock.IsLocked: Boolean;
    (----------------------------------
    |  True if the lock is on.        |
    +--------------------------------)

PROCEDURE TLock.ReverseState;
    (------------------------------------------------------
    |  Turn the lock on if it is off; turn it off if it is on.  |
    +----------------------------------------------------)

PROCEDURE TLock.LockIt;
    (----------------------------
    |  Turn the lock on.        |
    +--------------------------)

PROCEDURE TLock.UnlockIt;
    (----------------------------
    |  Turn the lock off.       |
    +--------------------------)
END;

TLockSpread = OBJECT(TDirectEntry)
(*********************************************************)
(*                                                        *)
(*     T L o c k S p r e a d                              *)
(*                                                        *)
(*     Purpose:                                           *)
(*                                                        *)
(*     Inherited from: TMonthSpread                       *)
(*                     TSpread                            *)
(*                     TDialogView                        *)
(*                     TView                              *)
(*                     TEvtHandler                        *)
(*                     TObject                            *)
(*                                                        *)
(*********************************************************)
```

```
    zLock:              Array[kM1..kYear] OF TLock;
    zSaveLockState:     TPeriodSelection;

PROCEDURE TLockSpread.InitLockSpread(theGoal: TGoalInfo; theType: GoalDataType);
    PROCEDURE TLockSpread.Init(theType:_GoalDataType); OVERRIDE;
    PROCEDURE TLockSpread.InitializeLocks;
    PROCEDURE TLockSpread.Free; OVERRIDE;
    PROCEDURE TLockSpread.HandleClearButton; OVERRIDE;
    PROCEDURE TLockSpread.HandleDeselect(theEditField: TEditField); OVERRIDE;
    PROCEDURE TLockSpread.DoChoice(origView: TView; itsChoice: Integer); OVERRIDE;
    PROCEDURE TLockSpread.HandleCardChange(newType: GoalDataType); OVERRIDE;
    PROCEDURE TLockSpread.HandlePercentsRadio;
    PROCEDURE TLockSpread.HandleValuesRadio;
    FUNCTION  TLockSpread.HandleLock(alreadyDone: Boolean): Boolean;
    FUNCTION  TLockSpread.HandleUnlock: Boolean;
    PROCEDURE TLockSpread.UnlockAll;
    FUNCTION  TLockSpread.GetLock(thePeriod: Integer): TLock;
    PROCEDURE TLockSpread.SetCurrentLockState(theState: TPeriodSelection);
    PROCEDURE TLockSpread.GetCurrentLockState(VAR theState: TPeriodSelection);
    PROCEDURE TLockSpread.SaveState; OVERRIDE;
    PROCEDURE TLockSpread.RevertToSave; OVERRIDE;
    PROCEDURE TLockSpread.Commit; OVERRIDE;
END;

{-------------------------------------------------+
|                                                 |
|    USpread.TLockSpread.p                        |
|                                                 |
|    ©1989 Pillar Corporation                     |
|                                                 |
+-------------------------------------------------}

{*************************************************}
(*    T L o c k                                   *)
(*                                                *)
(*    Overview:                                   *)
(*                                                *)
{*************************************************}

{-------------------------+
|  IRes                   |
+-------------------------}
{SS BOpenSpread}
PROCEDURE TLock.IRes (itsDocument: TDocument; itsSuperView: TView; VAR itsParams: Ptr); OVERRIDE;
BEGIN
    INHERITED IRes (itsDocument, itsSuperView,itsParams);
    fDefChoice := mLockHit;
END;

{-------------------------+
|  TrackMouse             |
+-------------------------}
{SS BResSpread}
PROCEDURE TLock.TrackMouse(aTrackPhase: TrackPhase; VAR anchorPoint, previousPoint, nextPoint: VPoint; mouseDidMove: Boolean);
BEGIN
    IF (aTrackPhase = trackRelease) THEN
        BEGIN
        IF ContainsMouse(nextPoint) THEN
            ReverseState;
        END;
    INHERITED TrackMouse(aTrackPhase, anchorPoint, previousPoint, nextPoint, mouseDidMove);
END;

{-------------------------+
|  DoSetCursor            |
+-------------------------}
{SS BRes}
FUNCTION TLock.DoSetCursor(localPoint: Point;cursorRgn: RgnHandle): Boolean; OVERRIDE;
VAR
    qdExtent:   Rect;
BEGIN
    IF (SELF <> gClipView) THEN
        BEGIN
        UseROMMap(True);
        SetCursor(GetCursor(kLockCursor)^^);
        GetQDExtent(qdExtent);
        RectRgn(cursorRgn, qdExtent);
        DoSetCursor := True;
        END
    ELSE
        DoSetCursor := False;
END;

{-------------------------+
|  IsLocked               |
+-------------------------}
{SS BResSpread}
FUNCTION TLock.IsLocked: Boolean;
BEGIN
    IsLocked := (fRsrcID = kLock);
END;

{-------------------------+
|  ReverseState           |
+-------------------------}
{SS BResSpread}
PROCEDURE TLock.ReverseState;
BEGIN
    IF (IsLocked) THEN
        UnlockIt
    ELSE
        LockIt;
END;

{-------------------------+
|  LockIt                 |
+-------------------------}
{SS BResSpread}
PROCEDURE TLock.LockIt;
VAR
```

```
        lockpic:    PicHandle;
        PRMReturn:  PRMrc;
BEGIN
        PRMReturn := gPRM.GetPResource( 'PICT', kLock, Handle(lockPic));
        SetPicture(lockpic, kRedraw);
        fAdornment := [adnLineTop, adnLineLeft, adnLineBottom, adnLineRight];
        fRsrcID := kLock;
END;

{------------------------+
|   UnlockIt             |
+------------------------}
{$S BResSpread}
PROCEDURE TLock.UnlockIt;
VAR
        lockpic:    PicHandle;
        PRMReturn:  PRMrc;
BEGIN
        PRMReturn := gPRM.GetPResource( 'PICT', kBlankLock, Handle(lockPic));
        SetPicture(lockpic, kRedraw);
        fAdornment := [];
        fRsrcID := kBlankLock;
END;

{*****************************************************************}
{*                                                               *}
{*      T L o c k S p r e a d                                    *}
{*                                                               *}
{*      Overview:                                                *}
{*                                                               *}
{*****************************************************************}

{------------------------+
|   InitLockSpread       |
+------------------------}
{$S BOpenSpread}
PROCEDURE TLockSpread.InitLockSpread(theGoal: TGoalInfo; theType: GoalDataType);
VAR
        thePicture:     TPictureRadio;
BEGIN
        InitDirectEntry(theGoal, theType);

InitializeLocks;
        zSaveLockState := NIL;

{ Select the Values Picture Radio, because we never start in Percent mode. }
        thePicture := TPictureRadio(FindSubView(kValuesPicture));
        IF (thePicture <> NIL) THEN
                thePicture.SetState(True, kRedraw);
END;

{------------------------+
|   Init                 |
+------------------------}
{$S BOpenSpread}
PROCEDURE TLockSpread.Init(theType: GoalDataType); OVERRIDE;
VAR
        theResID:       Integer;
        thePicture:     TPicture;
        valuePic:       PicHandle;
        PRMReturn:      PRMrc;
BEGIN
        INHERITED Init(theType);

CASE zGoal.RecordType OF
                kAssetDBRecord,
                kLibAndEqDBrecord,
                kRevenueDBRecord,
                kExpenseDBRecord:
                        IF (theType = kGoalAmount) THEN
                                theResID := kAmountPict
                        ELSE
                                theResID := kUnitPict;
                kGlobalsDBRecord:
                        IF (theType = kGoalAmount) THEN
                                theResID := kOutputPict
                        ELSE
                                theResID := kInputPict;
        END;

thePicture := TPicture(FindSubView(kValuesPicture));
        IF (thePicture <> NIL) THEN
                BEGIN
                        PRMReturn := gPRM.GetPResource( 'PICT', theResID, Handle(valuePic));
                        thePicture.SetPicture(valuePic, kRedraw);
                        thePicture.fRsrcID := theResID;
                END;
END;

{------------------------+
|   InitializeLocks      |
+------------------------}
{$S BOpenSpread}
PROCEDURE TLockSpread.InitializeLocks;
VAR
        i:          Integer;
        theView:    TView;
BEGIN
        FOR i := kM1 TO kYear DO
                BEGIN
                        theView := FindSubView(kLockNames[i]);
                        IF (theView <> NIL) THEN
                                TLock(theView).zPeriod := i;
                        zLock[i] := TLock(theView);
                END;
END;

{------------------------+
|   Free                 |
+------------------------}
{$S BClose}
PROCEDURE TLockSpread.Free; OVERRIDE;
```

```
BEGIN
    IF (zSaveLockState <> NIL) THEN
        zSaveLockState.Free;

INHERITED Free;
END;

{-----------------------}
|   HandleClearButton   |
{-----------------------}
{SS BResSpread}
PROCEDURE TLockSpread.HandleClearButton; OVERRIDE;
BEGIN
    UnlockAll;
    INHERITED HandleClearButton;
END;

{-----------------------}
|   HandleDeselect      |
{-----------------------}
{SS BResSpread}
PROCEDURE TLockSpread.HandleDeselect(theEditField: TEditField);
BEGIN
    IF (Member(theEditField, TEditReal) & HandleLock(False)) THEN
        GetLock(TEditReal(theEditField).zPeriod).LockIt;

INHERITED HandleDeselect(theEditField);
END;

{-----------------------}
|   DoChoice            |
{-----------------------}
{SS BResSpread}
PROCEDURE TLockSpread.DoChoice(origView: TView; itsChoice: Integer); OVERRIDE;
BEGIN
    Case itsChoice OF
        mPictureHit:
            BEGIN
                IF ((origView.fIdentifier = kPercentsPicture) & (NOT zPercent)) THEN
                    HandlePercentsRadio
                ELSE IF ((origView.fIdentifier = kValuesPicture) & zPercent) THEN
                    HandleValuesRadio
                ELSE
                    INHERITED DoChoice(origView, itsChoice);
            END;
        mLockHit:
            IF (TLock(origView).IsLocked) THEN
                BEGIN
                    IF (NOT HandleLock(True)) THEN
                        TLock(origView).UnlockIt;
                END
            ELSE
                BEGIN
                    IF (NOT HandleUnlock) THEN
                        TLock(origView).LockIt;
                END;
        OTHERWISE
            INHERITED DoChoice(origView, itsChoice);
    END;
END;

{-----------------------}
|   HandleCardChange    |
{-----------------------}
{SS BResSpread}
PROCEDURE TLockSpread.HandleCardChange(newType: GoalDataType); OVERRIDE;
VAR
    thePic:     TPicture;
    lockpic:    PicHandle;
    thePicID:   Integer;
    PRMReturn:  PRMrc;
BEGIN
    INHERITED HandleCardChange(newType);

thePic := TPicture(FindSubView(kValuesPicture));
    IF (thePic <> NIL) THEN
        BEGIN
            CASE zGoal.RecordType OF
                kAssetDBRecord,
                kLibAndEqDBrecord,
                kRevenueDBRecord,
                kExpenseDBRecord:
                    IF (newType = kGoalAmount) THEN
                        thePicID := kAmountPict
                    ELSE
                        thePicID := kUnitPict;
                kGlobalsDBRecord:
                    IF (newType = kGoalAmount) THEN
                        thePicID := kOutputPict
                    ELSE
                        thePicID := kInputPict;
            END;

PRMReturn := gPRM.GetPResource( 'PICT', thePicID, Handle(lockPic));
            thePic.SetPicture(lockpic, kRedraw);
            thePic.fRsrcID := thePicID;
        END;
END;

{-----------------------------}
|   HandlePercentsRadio       |
{-----------------------------}
{SS BResSpread}
PROCEDURE TLockSpread.HandlePercentsRadio;
VAR
    anArray:    RealArray;
BEGIN
    IF (Member(fCurrentEditText, TEditReal) & (TEditReal(fCurrentEditText).IsChanged)) THEN
        DoSpread;

zPercent := True;
    GetDisplayValues(anArray);
```

```
    zCurrent := anArray;
    SetDisplay(Percent);
    CalculatePercent;
END;

{--------------------------+
|   HandleValuesRadio      |
+--------------------------}
{$S BResSpread}
PROCEDURE TLockSpread.HandleValuesRadio;
VAR
    anArray:    RealArray;
BEGIN
    IF (Member(fCurrentEditText, TEditReal) & (TEditReal(fCurrentEditText).IsChanged)) THEN
        DoSpread;

zPercent := False;
    IF (zFields = kGoalAmount) THEN
        SetDisplay(Amt)
    ELSE
        SetDisplay(Unt);
    anArray := zCurrent;
    SetDisplayValues(anArray);
END;

{--------------------------+
|   HandleLock             |
+--------------------------}
{$S BResSpread}
FUNCTION TLockSpread.HandleLock(alreadyDone: Boolean): Boolean;
VAR
    theState:   TPeriodSelection;
    OKToLock:   Boolean;
BEGIN
    New(theState); FailNIL(theState);
    theState.IPeriodSelection;
    GetCurrentLockState(theState);
    IF (alreadyDone) THEN
        OKToLock := theState.NumberSelected >= 1
    ELSE
        OKToLock := theState.NumberSelected >= 2;
    theState.Free;
    IF (NOT OKToLock) THEN
        SysBeep(2);
    HandleLock := OKToLock;
END;

{--------------------------+
|   HandleUnLock           |
+--------------------------}
{$S BResSpread}
FUNCTION TLockSpread.HandleUnLock: Boolean;
BEGIN
    DoSpread;
    UpdateSubTotals;
    HandleUnlock := True;
END;

{--------------------------+
|   UnlockAll              |
+--------------------------}
{$S BResSpread}
PROCEDURE TLockSpread.UnlockAll;
VAR
    i:  Integer;
BEGIN
    FOR i := kM1 TO kM12 DO
        BEGIN
            GetLock(i).UnLockIt;
        END;
END;

{--------------------------+
|   GetLock                |
+--------------------------}
{$S BResSpread}
FUNCTION TLockSpread.GetLock(thePeriod: Integer): TLock;
{$IFC qPillarErrorAlert}
VAR
    theLock:    TLock;
BEGIN
    theLock := zLock[thePeriod];
    IF (theLock = NIL) THEN
        PillarErrorAlert('TLockSpread.GetLock', 'Could not find the lock.');
    GetLock := theLock;
END;
{$ELSEC}
BEGIN
    GetLock := zLock[thePeriod];
END;
{$ENDC}

{--------------------------+
|   SetCurrentLockState    |
+--------------------------}
{$S BResSpread}
PROCEDURE TLockSpread.SetCurrentLockState(theState: TPeriodSelection);
VAR
    i:  Integer;
BEGIN
    FOR i := kM1 TO kM12 DO
        IF (NOT theState.IsSelected(i)) THEN
            GetLock(i).LockIt
        ELSE
            GetLock(i).UnlockIt;
END;

{--------------------------+
|   GetCurrentLockState    |
+--------------------------}
```

```
{SS BResSpread}
PROCEDURE TLockSpread.GetCurrentLockState(VAR theState: TPeriodSelection);
VAR
    i: Integer;
BEGIN
    FOR i := kM1 TO kM12 DO
        IF (NOT GetLock(i).IsLocked) THEN
            theState.SelectPeriod(i, True);
END;

{-------------------+
|    SaveState      |
+-------------------}
{SS BChange}
PROCEDURE TLockSpread.SaveState;
VAR
    lockState: TPeriodSelection;
BEGIN
    IF (zSaveLockState <> NIL) THEN
        zSaveLockState.Free;
    New(lockState); FailNIL(lockState);
    lockState.IPeriodSelection;
    GetCurrentLockState(lockState);
    zSaveLockState := lockState;

INHERITED SaveState;
END;

{-------------------+
|    RevertToSave   |
+-------------------}
{SS BChange}
PROCEDURE TLockSpread.RevertToSave;
BEGIN
    IF (zSaveLockState <> NIL) THEN
        SetCurrentLockState(zSaveLockState);

INHERITED RevertToSave;
END;

{-------------------+
|    Commit         |
+-------------------}
{SS BChange}
PROCEDURE TLockSpread.Commit;
VAR
    lockState: TPeriodSelection;
BEGIN
    IF (zSaveLockState <> NIL) THEN
        zSaveLockState.Free;
    New(lockState); FailNIL(lockState);
    lockState.IPeriodSelection;
    GetCurrentLockState(lockState);
    zSaveLockState := lockState;

INHERITED Commit;
END;
```

What is claimed is:

1. In an electronic spreadsheet for processing numeric information, said spreadsheet operative in a digital computer and including a plurality of cells for entering data and formulas, and further including means for recalculating said cells in response to said entered data and formulas, a method for recalculating the spreadsheet comprising:

(a) entering in one cell a sum total;

(b) setting a lock flag in selected ones of said cells, each said selected one becoming a locked cell;

(c) counting the number of set lock flags;

(d) calculating the sum of all values stored in the locked cells;

(e) calculating a total to spread by subtracting said calculated sum from said sum total; and (f) displaying in cells which are not locked cells the total to spread divided by the sum of the total number of said cells less said number of set lock flags.

2. The method of claim 1, further comprising the step:

(g) removing the lock flag from any of said locked cells; and (h) repeating steps (c)–(f).

3. The method of claim 1, wherein step (b) comprises: setting a lock flag by entering data in selected ones of said cells, each of said selected ones becoming a locked cell.

4. The method of claim 1, wherein after step (b) further comprises the step:

(g) displaying an icon for each cell which is a locked cell.

5. The method of claim 1, wherein said step (a) comprises entering in one cell a sum total representing an annual dollar amount.

6. In a programmed computer, an improved electronic spreadsheet for processing numeric information, said spreadsheet operative in a digital computer and including a plurality of cells for entering data and formulas, and further including means for recalculating said cells in response to said entered data and formulas, the improvement comprising:

(a) input means for entering in one cell a sum total and for setting a lock flag in selected ones of said cells, each of said selected ones becoming a locked cell;

(b) means, coupled to said input means, for counting the number of set lock flags;

(c) first means, coupled to said counting means, for calculating the sum of all values stored in the locked cells;

(d) second means, coupled to said first calculating means, for calculating a total to spread by subtracting said calculated sum from said sum total; and (e) means, coupled to said second calculating means, for displaying in cells which are not locked cells the total to spread divided by the sum of the total number of said cells less said number of set lock flags.

7. In an electronic spreadsheet for processing numeric information for a user, said spreadsheet operative in a digital computer and including a plurality of cells for entering data and formulas, and further including means for recalculating said cells in response to said entered data and formulas, a method for calculating monthly figures based on an annual figure, said method comprising:

(a) entering into one cell said annual figure;
(b) entering into selected ones of twelve cells values representing monthly figures, wherein each of said twelve cells corresponds to a month of the year, each of said selected ones being protected against recalculation;
(c) counting the number of said selected ones;
(d) calculating the sum of the monthly figures in said selected ones;
(e) calculating a total to spread by subtracting said calculated sum from said annual figure; and
(f) displaying in non-selected ones of said twelve cells the total to spread averaged over the number of said non-selected ones of said twelve cells.

8. The method of claim 7, wherein after step (b) further comprises:
displaying a padlock icon proximate each of said selected ones.

9. The method of claim 7, further comprising the step:
(g) repeating steps (b)-(f) with different cells as the selected ones.

10. In an electronic spreadsheet for processing numeric information for a user, said spreadsheet operative in a digital computer and including a plurality of cells for entering data and formulas, and further including means for recalculating said cells in response to said entered data and formulas, a method for calculating quarterly figures based on an annual figure, said method comprising:

(a) entering into one cell said annual figure;
(b) entering into selected ones of four cells values representing quarterly figures, wherein each of said four cells corresponds to a quarter of the year, each of said selected ones being protected against recalculation;
(c) determining the number of said non-selected ones of said cells;
(d) calculating the sum of the quarterly figures in selected ones;
(e) calculating a total to spread by subtracting said calculated sum from said annual figure; and
(f) displaying in non-selected ones of said four cells the total to spread averaged over the number of said non-selected ones of said four cells.

11. The method of claim 10, further comprising:
(g) unlocking said one cell; and
(h) displaying in said one cell an annual figure which is a sum total of said four cells.

12. The method of claim 11, further comprising:
(i) repeating step (b) with new values; and
(j) repeating step (h).

* * * * *